US010661875B2

(12) United States Patent
Bellio et al.

(10) Patent No.: US 10,661,875 B2
(45) Date of Patent: May 26, 2020

(54) HYBRID BOAT

(71) Applicant: FPT INDUSTRIAL S.P.A., Turin (IT)

(72) Inventors: Francesco Bellio, Gassino Torinese (IT); Massimiliano Modica, Settimo Torinese (IT); Roberto Rossi, Varazze (IT); Alessandro Bernardini, Genoa (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 16/314,930

(22) PCT Filed: Jul. 11, 2017

(86) PCT No.: PCT/IB2017/054180
§ 371 (c)(1),
(2) Date: Jan. 3, 2019

(87) PCT Pub. No.: WO2018/011713
PCT Pub. Date: Jan. 18, 2018

(65) Prior Publication Data
US 2019/0225314 A1    Jul. 25, 2019

(30) Foreign Application Priority Data

Jul. 11, 2017  (IT) .................. 10201672139

(51) Int. Cl.
*B63H 23/10*    (2006.01)
*B63H 21/20*    (2006.01)
*B63H 23/30*    (2006.01)

(52) U.S. Cl.
CPC ............ *B63H 23/10* (2013.01); *B63H 21/20* (2013.01); *B63H 23/30* (2013.01); *B63H 2021/205* (2013.01); *Y02T 70/5236* (2013.01)

(58) Field of Classification Search
CPC ......... B63H 21/10; B63H 21/30; B63H 23/10
See application file for complete search history.

(56) References Cited

U.S. PATENT DOCUMENTS

2012/0258639 A1* 10/2012 Rolla ................. B63H 21/20
                                                                 440/3
2019/0225314 A1*  7/2019 Bellio ................ B63H 21/20

FOREIGN PATENT DOCUMENTS

DE       102011079036        1/2013
DE       102011079036 B4 * 12/2018 ............. B63H 23/18
(Continued)

OTHER PUBLICATIONS

Patent Cooperation Treaty, International Search Report and Written Opinion for International Application No. PCT/IB2017/054180, Sep. 22, 2017, 13 pages.

*Primary Examiner* — S. Joseph Morano
*Assistant Examiner* — Jovon E Hayes
(74) *Attorney, Agent, or Firm* — Stetina Brunda Garred and Brucker

(57) ABSTRACT

Hybrid boat comprising an internal combustion engine provided with a reversing device to allow at least one condition of forward movement and one of reverse movement of the boat, transmission means connected between said reversing device and a propeller or impeller, wherein said transmission means comprise a transfer box having a first inlet, a second inlet and a single outlet, and a first drive shaft interposed between said reversing device and said first inlet and a second drive shaft interposed between said single outlet and said propeller or impeller, and an electric motor operatively connected with said second inlet, wherein said transfer box comprises means for selectively connecting said internal combustion engine and/or said electric motor with said single outlet.

8 Claims, 3 Drawing Sheets

(56) References Cited

FOREIGN PATENT DOCUMENTS

| | | | | |
|---|---|---|---|---|
| GB | 2532731 | 6/2016 | | |
| GB | 2532731 A | * 6/2016 | ............ | B63H 23/18 |
| JP | S6018495 | 1/1985 | | |
| WO | WO2008145684 | 12/2008 | | |
| WO | WO2010141873 | 12/2010 | | |

* cited by examiner

HYBRID BOAT

CROSS-REFERENCE TO RELATED APPLICATIONS

The present application claims priority to PCT International Application No. PCT/IB2017/054180 filed on Jul. 11, 2017, which application claims priority to Italian Patent Application No. 102016000072139 filed Jul. 11, 2016, the entirety of the disclosures of which are expressly incorporated herein by reference.

STATEMENT RE: FEDERALLY SPONSORED RESEARCH/DEVELOPMENT

Not applicable.

TECHNICAL FIELD OF THE INVENTION

The invention relates to the field of hybrid boats, namely boats having both an electric drive and an internal combustion engine.

STATE OF THE ART

In the naval field, series hybrid drives are largely used, namely hybrid drives in which the drive shaft of the internal combustion engine is exclusively driven by an electric motor, which, in turn, is powered by a battery pack or by an electric generator, which is caused to rotate by an internal combustion engine.

When dealing with leisure boats, a parallel hybrid drive is preferably used, because of the fact that the sole internal combustion engine ensures a better efficiency than the series drive, due to the lack of electric energy conversion losses.

According to a known parallel hybrid configuration, the electric motor is on-axis connected to the drive shaft between the internal combustion engine and the propeller.

This also implies that, when the electric motor is deactivated, the inertia of the drive shaft is increased by the additional weight of the electric windings of the rotor.

On the other hand, when the electric motor is active and the internal combustion engine is deactivated, the entire drive shaft, from the propeller to the reversing device, is dragged in rotation by the electric motor.

SUMMARY OF THE INVENTION

The object of the invention is to provide an efficient electric drive, which ensures a low total inertia.

The idea on which the invention is based is that of dividing the drive shaft, from the internal combustion engine to the propeller, into two parts and to interpose a transfer box, which is connected to the electric motor.

The transfer box allows to connect the electric engine or the second portion of the drive shaft—connected, in turn, to the output shaft of the internal combustion engine—or both the electric motor and the internal combustion engine to a propeller or impeller of a pump-jet.

According to the invention, there is provided a hybrid boat according to claim 1.

The claims describe preferred embodiments of the invention, thus forming an integral part of the description.

BRIEF DESCRIPTION OF THE FIGURES

Further objects and advantages of the invention will be best understood upon perusal of the following detailed description of an embodiment thereof (and of relative variants) with reference to the accompanying drawings merely showing non-limiting examples, wherein.

In the figures, the same numbers and the same reference letters indicate the same elements or components.

For the purposes of the invention, the term "second" component does not imply the presence of a "first" component. As a matter of fact, these terms are only used for greater clarity and should not be interpreted in a limiting manner.

DETAILED DESCRIPTION OF EMBODIMENTS

Figure 1:
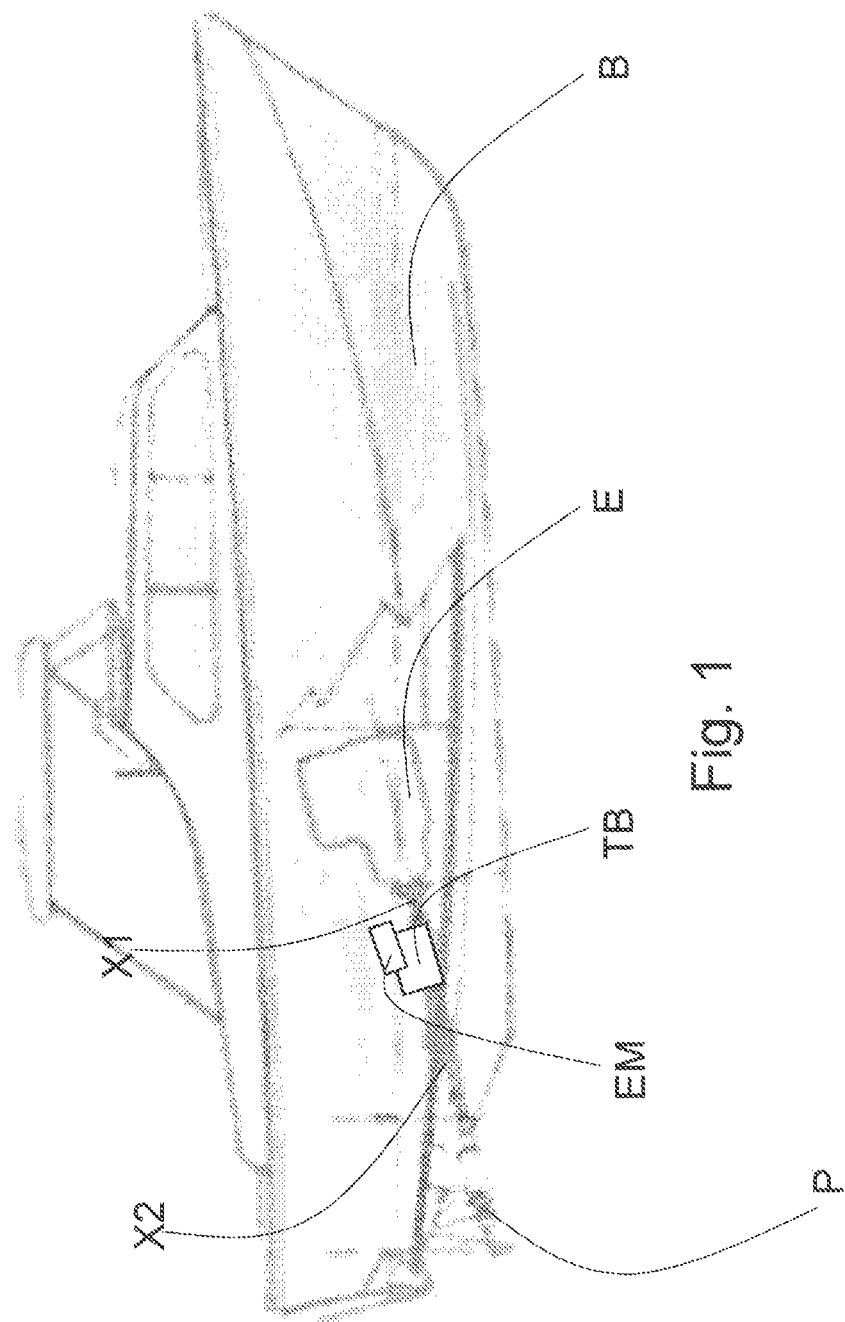
FIG. 1 shows a boat with a hybrid drive according to the invention, implementing a transfer box.

With reference to FIG. 1, a boat B comprises an internal combustion engine, preferably a Diesel cycle engine, which is preferably provided with a reversing device so as to enable at least one condition of forward movement and one of reverse movement.

A first shaft X1 is connected between an outlet of said reversing device of the internal combustion engine and a first inlet IN1 of the transfer box TB, whereas an electric motor EM has its own rotor connected to a second inlet IN2 of the transfer box TB. A second shaft X2 is connected between said single outlet OUT and a propeller or impeller of a pump-jet on the outside of the hull. Therefore, the second shaft goes through the hull in a known manner.

The transfer box according to the invention comprises two drive shafts A1 and A2, which are parallel to each other. The first one, A1, has an end defining said first inlet IN1 and a second end, opposite the first one, defining said single outlet OUT.

The first shaft is formed in two parts A11 and A12. The first part defines said first inlet and the second part defines said single outlet.

The two parts are reversibly connectable to each other by means of a first dog clutch DC1, which can axially slide on and is integral in rotation with said first part A11.

On the second part A12 there is fitted a first toothed wheel G1, which is reversibly connectable to said second part A12 by means of a second dog clutch DC2, which can axially slide on and is integral in rotation with said second part A12.

Said first toothed wheel operatively engages a second toothed wheel G2 in one single piece with said second shaft A2

Figure 2:
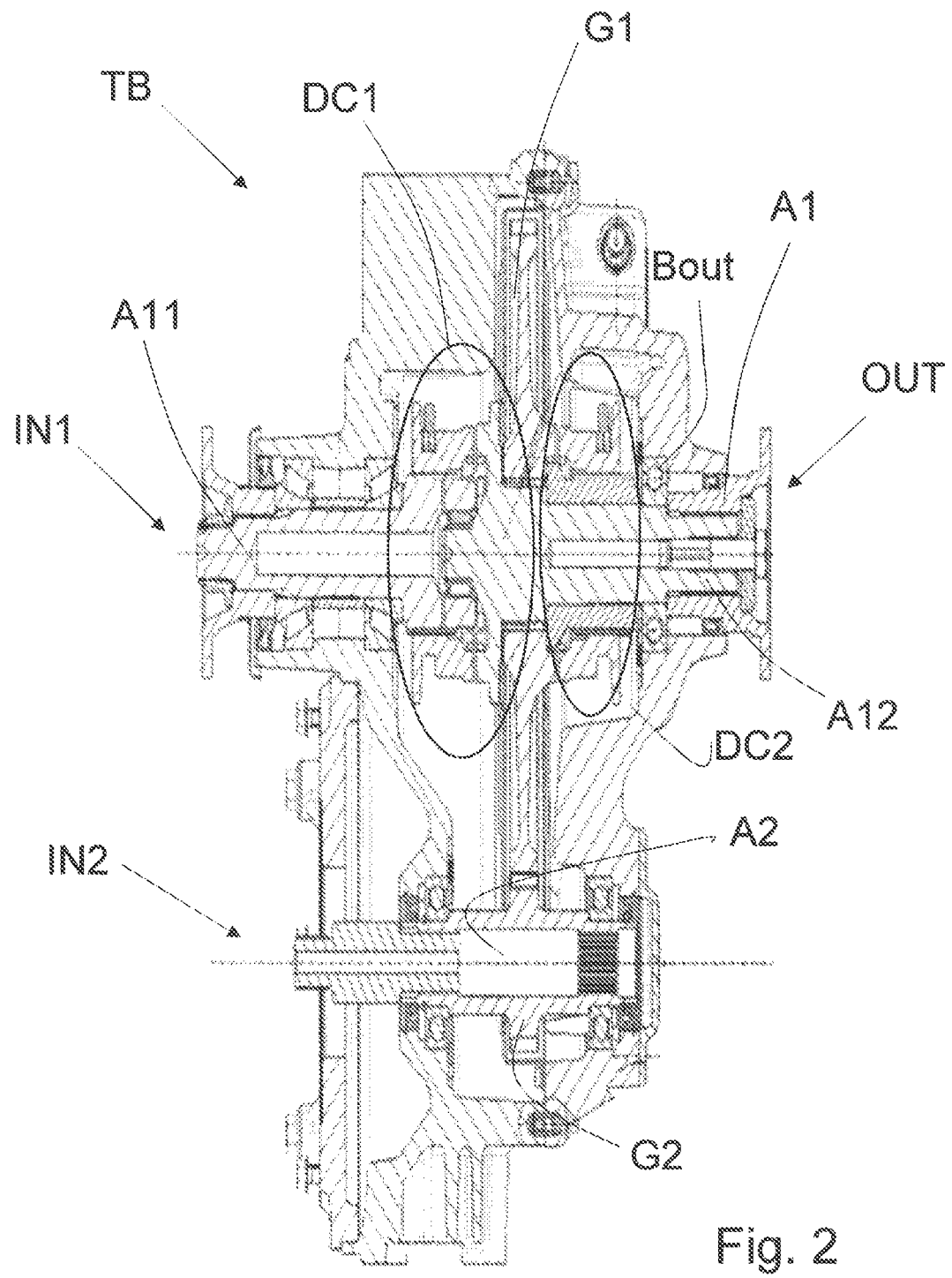
FIG. 2 shows a longitudinal section of a first preferred variant of the transfer box shown in FIG. 1.
Figure 3:
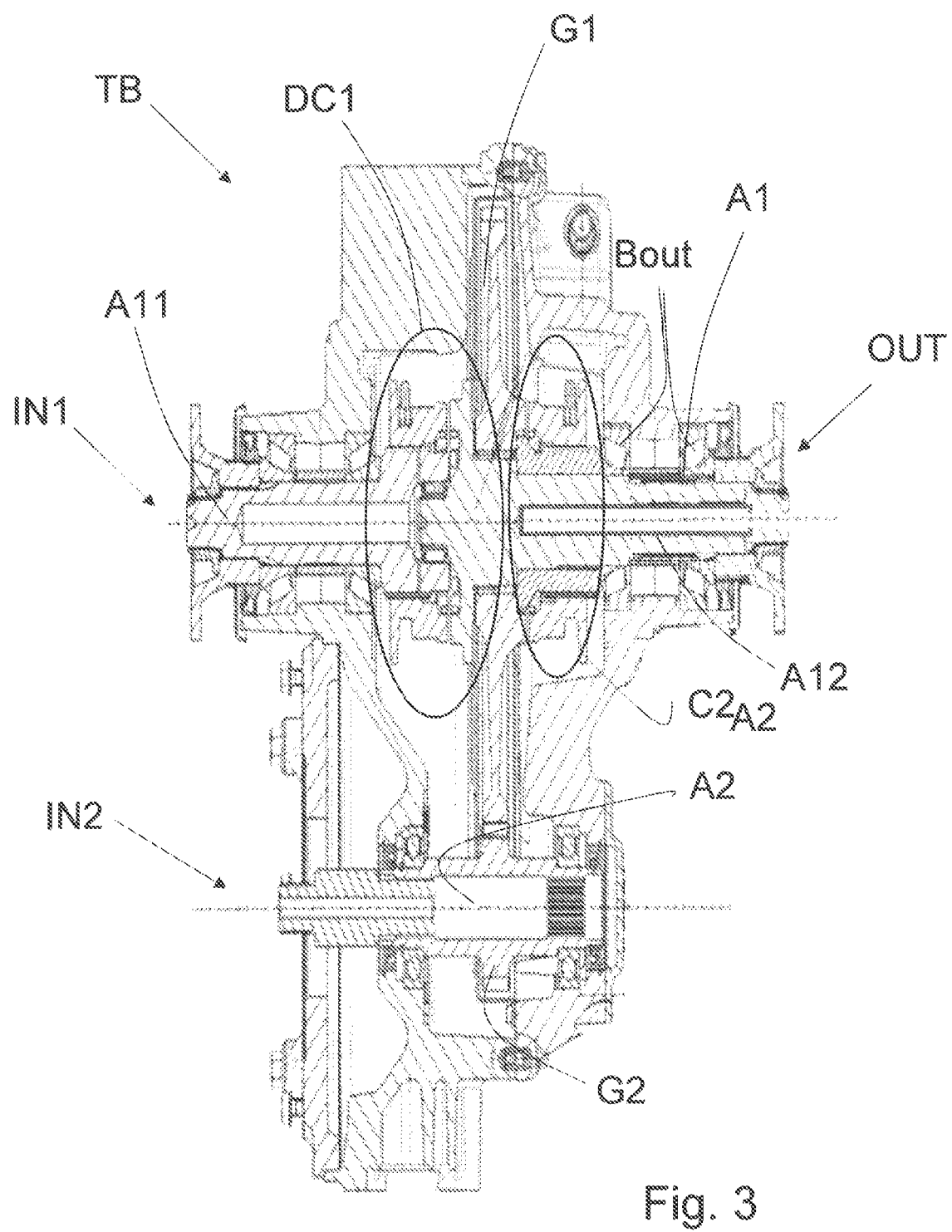
FIG. 3 shows a longitudinal section of a second preferred variant of the transfer box shown in FIG. 1.

FIGS. 2 and 3 are identical to one another with the sole exception of the Bout bearing associated with the second part A12 of the first shaft A1. As a matter of fact, in FIG. 2 it is a ball bearing, whereas in FIG. 3 a thrust bearing is disclosed, preferably comprising two rings of opposite conical rollers.

The solution of FIG. 3 is very advantageous, as it allows to avoid the installation of a similar bearing to support the second drive shaft X2.

As far as the second shaft A2 of the transfer box is concerned, the second inlet IN is preferably located on the same side of the first inlet INT1. In other words, both inlets IN1 and IN2 are facing the bow.

It is disclosed that the end opposite to the second inlet IN2 of the second shaft A2 is hidden by a lid, which can be removed in order to connect, preferably by means of a clutch or dog clutch, a user, for example for the operation of winches and other on-board devices.

In this way it is, advantageously, possible to operate said user during "internal combustion engine" navigation and, vice versa, it can be exploited the electric motor to drive the boat in harbor areas or in areas where "internal combustion engine" navigation is forbidden, if necessary disconnecting said user.

Preferably, in a first operating condition, the first dog clutch is engaged making the first and second part A11 and A12 rotate integrally with each other to transfer torque from the internal combustion engine E to the propeller (P). The second dog clutch is disengaged, so that a rotor of the electric motor is disconnected from drive shaft line.

According to a second operating condition, on the contrary, the first dog clutch DC1 is disengaged and the second connector DC2 is engaged so that the electric motor can drive in rotation the propeller P, while the first drive shaft X1 is disconnected from the drive shaft line.

According to a third operating condition, both dog clutches are engaged, so that both the internal combustion engine and the electric motor are connected to the drive shaft line. The electric motor can operate as electric motor complementing the internal combustion engine, especially in planing-start conditions, or it can operate as electric generator to store electric energy in a specific battery pack, which is not shown.

The aforesaid operating configurations can be managed by means of suitable electric or hydraulic or electric-hydraulic actuators, which are designed to operate said clutches.

This configuration allows to connect the transfer downstream of the reversing device included in the internal combustion engine. As a matter of fact, it is known that reversing devices, besides enabling a forward movement, a reverse movement and a neutral condition, also provide a given reduction of the revolutions, with a significant increase in the torque delivered. Nevertheless, the transfer box according to the invention, as it comprises dog clutches, can more easily support high torques and, hence, it allows manufacturers to keep the reduction gears with a lower inertia of the axis line upstream, especially in electric drive conditions.

As it can be seen in FIG. 1, if the internal combustion engine E is housed approximately at the center of the boat, in the longitudinal direction thereof, the electric motor EM is closer to the internal combustion engine E with a better collocation of the weights in a central area of the boat.

Advantageously, the transfer can be inserted on the axis line regardless of the type of internal combustion engine and reducer used, as it can be equipped with its own thrust bearing, which is capable of supporting the thrust of the propeller both during the forward movement and during the reverse movement.

The non-limiting example described above can be subjected to variations, without for this reason going beyond the scope of protection of the invention, comprising all equivalent embodiments for a person skilled in the art.

When reading the description above, a skilled person can carry out the subject-matter of the invention without introducing further manufacturing details. The elements and features contained in the different preferred embodiments, drawings included, can be combined with one another, without for this reason going beyond the scope of protection of this patent application. The information contained in the part concerning the state of art only serves the purpose of better understanding the invention and does not represent a declaration of existence of the items described. Furthermore, if not specifically excluded by the detailed description, the information contained in the part concerning the state of art should be considered as an integral part of the invention.

The invention claimed is:

1. Hybrid boat comprising:
   an internal combustion engine provided with reversing device to allow at least one condition of forward movement and one of reverse movement of the boat,
   a transfer box having a first inlet, a second inlet and a single outlet,
   a first drive shaft interposed between said reversing device and said first inlet,
   a second drive shaft interposed between said single outlet and a propeller or impeller, and
   an electric motor operatively connected with said second inlet,
   wherein said transfer box comprises two transfer box drive shafts parallel to each other, a first shaft of the two transfer box drive shafts having a first end defining said first inlet and a second end, opposite the first end, defining said single outlet, a second shaft of the two transfer box drive shafts having a first end defining said second inlet, said transfer box further comprising a clutch for selectively connecting said first end of the first shaft and/or said first end of the second shaft with said second end of the first shaft.

2. Boat according to claim 1, wherein said clutch comprises a first dog clutch, wherein said first shaft is formed in two parts, wherein a first part of said two parts defines said first end and a second part of said two parts defines said single outlet and wherein said first and second part are releasably connectable to each other by means of said first dog clutch.

3. Boat according to claim 2, wherein said clutch comprises a second dog clutch and wherein a first toothed wheel is fitted on said second part; the first toothed wheel being connectable to said second part by means of said second dog clutch; wherein said second shaft is in one piece and comprises a second toothed wheel that operatively connects with said first wheel.

4. Boat according to claim 3, wherein said transfer box is configured to allow:
   a first operating condition, in which said first dog clutch is engaged so as to make the first and second part rotate integrally with each other to transfer torque from the internal combustion engine to said propeller or impeller, while said second dog clutch is disengaged, so that a rotor of the electric motor is disconnected from said second drive shaft;
   a second operating condition, in which said first dog clutch is disengaged and said second dog clutch is engaged so that the electric motor can drive in rotation said propeller or impeller, while said first drive shaft is disconnected from said second drive shaft;
   a third operating condition, in which both said first and second dog clutches are engaged, so that both the internal combustion engine and the electric motor are connected to said second drive shaft.

5. Boat according to claim 4, wherein according to said third operating condition said electric motor can operate as electric motor complementing the internal combustion engine, or can operate as electric generator to store electric energy in a specific battery pack.

6. Boat according to claim 1, wherein said first and second inlet are facing the bow.

7. Boat according to claim 2, wherein said transfer box further comprises a bearing associated with said second part of the first shaft and wherein said bearing is of the thrust type.

8. Boat according to claim 4, further comprising a processor configured to control said clutch, said internal combustion engine and said electric motor to produce said first, second and third operating conditions.

* * * * *

UNITED STATES PATENT AND TRADEMARK OFFICE
CERTIFICATE OF CORRECTION

PATENT NO. : 10,661,875 B2
APPLICATION NO. : 16/314930
DATED : May 26, 2020
INVENTOR(S) : Francesco Bellio et al.

Page 1 of 1

It is certified that error appears in the above-identified patent and that said Letters Patent is hereby corrected as shown below:

On the Title Page

(30) Foreign Application Priority Data, the portion reading "Jul. 11, 2017" should read -- "Jul. 11, 2016" --.

Signed and Sealed this
Twenty-seventh Day of October, 2020

Andrei Iancu
*Director of the United States Patent and Trademark Office*